United States Patent Office 3,030,355
Patented Apr. 17, 1962

3,030,355
PROCESS FOR THE SEPARATION OF
THEVETINS A AND B
Michel Delalande and Jacques Baisse, both of 16 Rue
Henri-Regnault, Courbevoie, France
No Drawing. Filed May 16, 1960, Ser. No. 29,126
2 Claims. (Cl. 260—210.5)

This invention relates to a process for extracting thevetins A and B from total thevetin which is extracted from the seeds of *Thevetia neriifolia* and is itself well-known.

The exact chemical formulae for the thevetins A and B have not been heretofore satisfactorily established. Thevetin A seems to be in substantial accordance with the formula normally allotted thereto in the literature on the subject, but thevetin B differs markedly therefrom.

Thevetins A and B have the same uses as total thevetin. However, it has been found that on the one hand thevetin A is more active and effective than thevetin B, for equal weights, and on the other hand thevetin B is responsible for various secondary physiological effects which give some trouble in the posology, viz. frequent diarrhoeas. Consequently, it is important to provide a satisfactory process for their separation from total thevetin.

The two substances may be distinguished by their melting points which are:

Thevetin A: 187° C.–191° C. (corrected)
Thevetin B: 192° C.–196° C. (corrected)

Moreover, a ketonic or aldehydic function is attributed to thevetin B, which is not fully explained but the existence of which serves as a basis for the process according to the present invention.

Thus, thevetin A and thevetin B when separated are two different species as regards their physico-chemical qualities, but in total thevetin they are combined in such a way that separation thereof cannot be effected by the accepted methods of fractional crystallisation, but solely by special methods such as chromatography or extraction by a solvent under reflux.

The quantities of solvent employed and the periods of time involved in the extraction by a solvent under reflux are considerably reduced according to the invention by adding to an aqueous alcoholic solution of total thevetin a quantity of bisulfite of soda ($SO_3HNa$).

Thus, in one method a quantity of bisulfite of soda, slightly in excess of the quantity corresponding to one molecule of bisulfite per molecule of thevetin, is added to an aqueous ethanolic solution of total thevetin. In these conditions, it is possible by means of extraction under reflux with normal butanol as the extraction solvent to obtain thevetin A containing only traces of thevetin B; in a reflux extraction apparatus, the addition to the normal aqueous ethanol phase of a dilute solution of bisulfite of soda increases the output of the apparatus without jeopardising the degree of separation.

*Example*

100 gr. of total thevetin are dissolved in 1500 cc. of aqueous ethanol at 96°. Then 50 cc. of a 30% solution of bisulfite of soda is added. The solution is left for about one hour and is then diluted with three liters of water, and the resulting solution is extracted three times in a reflux extraction apparatus with four liters of normal butanol as the extraction solvent. Thevetin A passes into said butanol which is then washed with distilled water and evaporated to dryness. The crude thevetin A is recrystallised by dissolving in absolute ethanol (100 cc.) and precipitating with ten volumes of isopropyl oxide. The residual thevetin B of the bisulfite solution is liberated, soda is added till the pH is 8, and the solution is then extracted under reflux with butanol in the same way as was the A fraction.

We claim:
1. A process for extracting thevetin A from total thevetin comprising adding to an aqueous ethanol solution of total thevetin a quantity of bisulfite of soda slightly in excess of the quantity corresponding to one molecule of bisulfite per molecule of total thevetin, and extracting the solution under reflux using normal butanol as the extraction solvent.

2. A process for extracting thevetins A and B from total thevetin comprising adding to an aqueous ethanol solution of total thevetin a quantity of bisulfite of soda slightly in excess of the quantity corresponding to one molecule of bisulfite per molecule of total thevetin, extracting thevetin A from the solution under reflux using normal butanol while the thevetin B is retained therein, treating the bisulfite solution with soda to a pH of 8, and extracting the thevetin B from the solution with butanol.

No references cited.